(No Model.)

G. BUNGARZ.
CARIOLE.

No. 254,196. Patented Feb. 28, 1882.

Witnesses.
H. D. Williams
E. J. Baker

Gottfried Bungarz.
*Inventor.*
per Alfred Shedlock
Atty.

N. PETERS. Photo-Lithographer. Washington, D. C.

UNITED STATES PATENT OFFICE.

GOTTFRIED BUNGARZ, OF BROOKLYN, NEW YORK.

CARIOLE.

SPECIFICATION forming part of Letters Patent No. 254,196, dated February 28, 1882.

Application filed December 5, 1881. (No model.)

*To all whom it may concern:*

Be it known that I, GOTTFRIED BUNGARZ, of Brooklyn, county of Kings, State of New York, have invented certain new and useful Improvements in Carioles, of which the following is a specification.

This invention relates to that class of carriages of the omnibus type known as "carioles." These vehicles are principally used at places of summer resort and in the country, and it is desirable that the same be provided with quick entrance and exit facilities for the passengers and be so constructed as to afford the passengers every facility for enjoying the surrounding views. To this end the seats are arranged transversely instead of longitudinally to the body, as heretofore in this kind of vehicle, the entrance to the last seat, which is over the hind axle, being at the rear, and the front seat, which is over the front running-gear, is reached in the ordinary manner, the center seat's entrances being at the sides between the front and hind wheels.

But to describe my invention more particularly I will refer to the accompanying drawings, forming part of this specification, in which—

Figure 1:
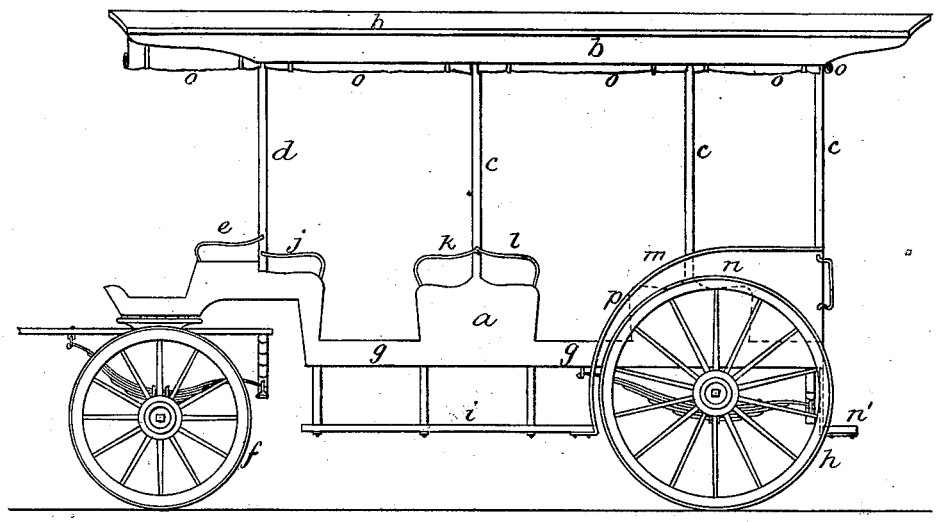
Figure 2:
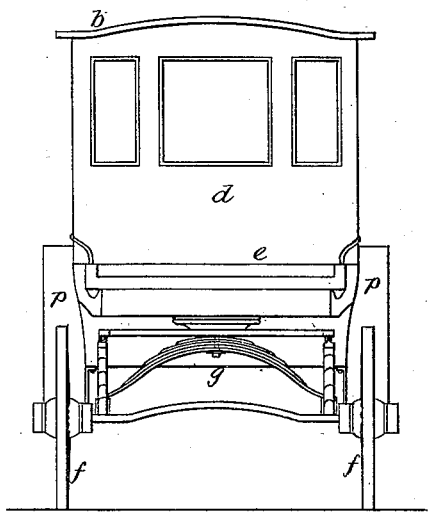
Figure 3:
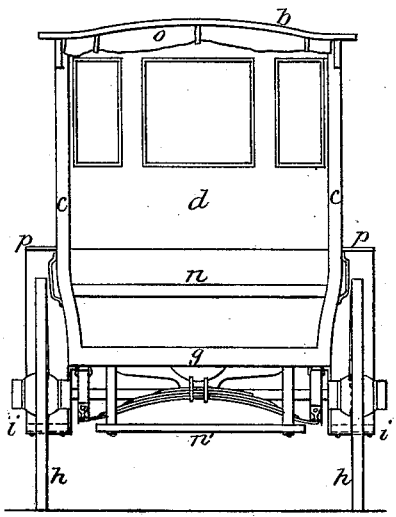

Figure 1 is a side elevation of my improved cariole. Fig. 2 is a front elevation of the same, and Fig. 3 is a rear elevation.

The body $a$ is of light construction, as shown, and is provided with a roof, $b$, supported by the posts $c\ c$ and the front $d$, which forms the back of the front seat, $e$, and is provided with windows. The front seat, $e$, is directly over the fifth wheel of the front wheels, $f\ f$, and the bottom $g$ of the body arched to allow the same to turn, said bottom $g$ beyond this point to the rear being horizontal and of such a height as to be above the axle of the hind wheels, $h\ h$.

Openings are provided at both sides between the front and hind wheels, as well as the steps $i\ i$, for entrance and exit to and from the four center seats, $j\ k\ l\ m$, and the rear seat, $n$, is reached by the rear step, $n'$.

All the seats, as will be observed, are arranged transversely to the body and means provided for the passengers to enter and leave all the seats simultaneously, and the whole of the inside made available for seating capacity; and by this construction I am enabled to provide seats for twenty-two persons besides the driver, two on the front seat, $e$, with the driver and four on each of the other seats, with a saving of at least two feet in body-length in vehicles of this class heretofore made to carry the same number of persons, which have always had the seats arranged longitudinally. This saving in length, as will be well understood by those skilled in carriage-making, of course means a great saving in weight of materials necessary in the construction and in the cost of manufacture.

To provide for protection to the passengers in inclement weather, the curtains $o\ o$ are fastened to the roof $b$ at the sides and rear and are rolled up, as shown, so as not to obstruct the view, but are adapted to be dropped down when desired.

$p\ p$ are guards for the rear wheels, $h\ h$, which, with their springs, as well as the front running-gear, are of the ordinary construction.

The cariole may be made with another pair of center seats to accommodate eight more persons, or the seats $k$ and $l$ may be omitted, thus shortening the vehicle and reducing the carrying capacity to fourteen persons.

Having now described my invention, what I claim, and desire to secure by Letters Patent, is—

In a cariole, in combination, the transverse center seats, $j$, $k$, $l$, and $m$, with the openings at the sides of the body $a$, and side steps, $i\ i$, and the transverse rear seat, $n$, with the opening at the rear of the body, and rear step, $n'$, substantially as and for the purpose set forth.

In testimony whereof I have hereunto set my hand at New York, county and State of New York, this 3d day of December, A. D. 1881.

GOTTFRIED BUNGARZ.

In presence of—
 H. D. WILLIAMS,
 ERNEST G. BAKER.